(12) United States Patent
Twerdok

(10) Patent No.: US 7,140,288 B2
(45) Date of Patent: Nov. 28, 2006

(54) DEVICE FOR SHAPING A FOOD PRODUCT

(76) Inventor: John W. Twerdok, 1768 Meadowcrest Dr., Pittsburgh, PA (US) 15241

( * ) Notice: Subject to any disclaimer, the term of this patent is extended or adjusted under 35 U.S.C. 154(b) by 226 days.

(21) Appl. No.: 10/132,923

(22) Filed: Apr. 26, 2002

(65) Prior Publication Data
US 2003/0203086 A1 Oct. 30, 2003

(51) Int. Cl.
A47J 43/00 (2006.01)
B26D 1/26 (2006.01)
B26D 3/08 (2006.01)

(52) U.S. Cl. .............................. 83/862; 83/146; 83/465; 83/605; 83/607; 83/678; 83/861; 30/287; 30/359; 426/104; 426/518; 452/30; 452/148

(58) Field of Classification Search ................. 83/465, 83/622, 633, 635, 862, 883, 145, 146, 618, 83/620, 678, 695, 454, 599, 605–609, 861, 83/879, 880, 932; 30/363, 287, 359; 426/76, 426/104, 105, 383, 518; 452/30, 148; D1/106–111
See application file for complete search history.

(56) References Cited

U.S. PATENT DOCUMENTS

| | | | | |
|---|---|---|---|---|
| 1,131,431 A * | 3/1915 | Smith | ............................ | 83/862 |
| 1,344,286 A * | 6/1920 | Wolff | ............................. | 83/69 |
| 1,405,401 A * | 2/1922 | Eger | ............................. | 83/620 |
| 1,411,774 A * | 4/1922 | Engel | ........................... | 83/695 |
| 1,667,196 A * | 4/1928 | Darling | ........................ | 83/607 |
| 2,243,623 A * | 5/1941 | Ewald | ....................... | 83/868 X |
| 2,335,806 A * | 11/1943 | Sjostrom | ........................ | 452/6 |
| 3,367,379 A * | 2/1968 | Ryan et al. | ................... | 83/883 |
| 3,408,889 A * | 11/1968 | Murphy | ....................... | 83/599 |
| 3,465,802 A * | 9/1969 | Alea | ........................... | 30/287 |
| 3,999,293 A | 12/1976 | Zubrycki | ..................... | 30/124 |
| 4,338,840 A * | 7/1982 | Farrell et al. | ................. | 83/622 |
| 4,694,716 A * | 9/1987 | Sakamoto | .................... | 83/112 |
| 4,697,488 A * | 10/1987 | Cole | ........................ | 83/437.2 |
| 4,879,932 A * | 11/1989 | Scalise et al. | ................. | 83/30 |
| 4,967,477 A | 11/1990 | Sanford | ....................... | 30/315 |
| 4,976,029 A | 12/1990 | Kennedy | ..................... | 30/114 |
| 5,067,241 A | 11/1991 | Goodman | .................... | 30/289 |
| 5,555,785 A * | 9/1996 | Scalise et al. | ................ | 83/589 |
| 5,976,585 A | 11/1999 | Gagliardi, Jr. | ............... | 426/76 |
| 6,018,876 A | 2/2000 | Hodges et al. | ............. | 30/279.2 |
| 6,187,361 B1 | 2/2001 | Fleetham | .................... | 426/513 |
| 6,233,809 B1 * | 5/2001 | Geffros et al. | ........... | 29/525.11 |

* cited by examiner

Primary Examiner—Clark F. Dexter
(74) Attorney, Agent, or Firm—Aileen C. Addessi

(57) ABSTRACT

A method and cutting device makes incisions in an elongated food product, like a hot dog or sausage, to form a pattern or character after the product is cooked. One form of the cutter includes a hinged housing into which the food product is positioned. The housing includes blades that contact and cut the food product as the housing is closed. Another form of the cutter includes a wheeled cutter and a rack. The wheeled cutter includes gear teeth that permit the rack to be drawn under the wheel as the wheel engages gear openings formed in the rack as the wheel rotates. A food product positioned on the rack is cut by blades on the wheel as the rack travels under the wheel.

9 Claims, 7 Drawing Sheets

DEVICE FOR SHAPING A FOOD PRODUCT

BACKGROUND OF THE INVENTION

The present invention relates to food preparation, and, more particularly, to a method and device that is used to create sculpted food products such as hotdogs and sausages or frankfurters.

The appearance of prepared food is very important. Food is often given an artistically pleasing appearance, or presentation, for more formal dining. At other times, prepared food is given a more whimsical appearance. For example, hotdogs and sausages are typically roasted over a barbeque or open campfire, boiled in water, or cooked in a microwave oven. These food products are often served in elongated buns, and may be covered with condiments such as ketchup, mustard, and relish. More recently, these condiments have been packaged and colored in such a manner that their application can be a form of art, and certainly fun for children. Also, it is desirable to cut tubular shaped food products such as hotdogs and sausages in such a manner that the food product forms a fun shape that is appealing to children during the cooking process. For example, it is known to cut a hot dog in such a manner that the hot dog forms a figure with arms and legs during the cooking process. The cutting of these food products also leads to more evenly cooked food, and allows unwanted grease and fat to drain during cooking.

The food products themselves have been cut manually to provide a sculptured product. It is, however, rather tedious, difficult, and unsafe to sculpt a hot dog with a knife, due to the complex set of incisions required and the slippery nature of the food. Also, parents usually view hotdogs and sausages as a convenient meal to prepare and serve, and are often in a hurry to prepare and serve them. Lengthy, dangerous, or complex cutting processes are not acceptable. Similarly, manual cutting of the product is not amenable to the sale or cooking of properly cut products in quantity.

SUMMARY OF THE INVENTION

A method and shaping device is provided by the present invention that can be used to quickly and consistently form food products to create unique designs whose shapes evolve during the cooking process to provide a safe and fun approach to serving a popular food item. It is known that cutting hotdogs or sausages, beginning at the side surfaces, at angles nearly parallel to the central axis will produce sections that tend to "curl" away from the main body during the cooking process. Thinner, longer sections tend to curl more than short, thick ones. Furthermore, a partial cut passing through the central axis of the food product, and having a differential length (the front being greater than the rear) will produce similarly shaped sections that not only curl outward, away from the central axis, but also rotate in a manner that exposes the interior of the cut surfaces. For example, the food product shown in FIG. 1 was sculpted to form a figure with arms, legs and a facial expression when it is cooked. FIG. 2 shows the food product shown in FIG. 1 prior to cooking.

The preferred embodiments of the present invention are cutters that are used to cut tubular food products in such a manner that a figure with arms and legs is formed as the food product is cooked. A first preferred embodiment includes a hinged housing with cutting blades mounted or formed in the interior of the housing. A food product is placed inside the housing prior to cooking, and the housing is closed to make the required incisions in the product. A second embodiment includes a wheel on which blades are formed, and a rack on which the food product is placed. The wheel is rolled over the rack, and the blades on the wheel contact and form the desired incisions in the food product.

The production of a sculpted shape demands that accurate, clean cuts be produced. It was found that a slight shearing motion of the blades was desirable to break the surface tension offered by the "skin" of the food product, and that the same shearing motion produced more controlled cuts. Furthermore, the order of blade contact with the food product has an effect on the quality and consistency of the cuts. Therefore, the placement of the hinge in the hinged embodiment of the present invention and the shape and order of contact of cutting blades produce a more precise set of incisions. The main cut, separating the legs of the figure is made first, followed by the arms, and finally the facial expression. Preferably, the inclusion of a cutting shield acts to stabilize the food product prior to cutting, and aids in the retraction of the blades from the food product when finished. Allowing the main blade, which makes the cut between the "legs" of the figure, to contact the food product first helps to effectively hold the food product in place—permitting the remaining blades to make consistent cuts, and minimizing the movement of the food product.

The surface of the wheel of the wheeled embodiment acts to secure the food in place in a similar manner as the cutting shield of the hinged embodiment, and a shearing motion of the blades is obtained from the circular rotation of the wheel. The housing of wheeled embodiment also aids in holding the food product and resisting the upward force exerted on the food product during the withdrawal of the cutting blades from the food product. In effect, it prevents the food product from "wrapping itself around" the wheel during the cutting process.

It was also discovered that partial cuts, or punctures, can be made through the exterior surface of the food product at or near one end of the product prior to cooking the product to convey the appearance of a facial expression such as eyes and a wide open smile upon cooking the product. Both embodiments include smaller, shorter blades for this purpose.

The figure that results from use of the preferred embodiments becomes more apparent during the cooking process, produces a slightly different and unique shape with each cooking event, has an immediate appeal to children, allows for more even cooking especially the interior of the food product, provides an outlet for unwanted fat and grease, can easily fit into a bun or roll, and can be decorated and have its appearance enhanced with condiments such as ketchup, mustard, relish, diced onions, and chili sauce. The hinged embodiment is particularly useful to the home consumer who prepares food products for children. These families tend to have little time for food preparation, and therefore, may consume more than the average amount of hot dogs and sausages. The objectives and advantages of the hinged embodiment include:

1) One pass operation—the device is simple and easy to operate; if necessary, it can be operated using one hand, clean;
2) Accurate slicing—the cutter is able to make consistent, controlled cuts—not tearing or pinching the food product;
3) Safe operation—the blades are contained within the interior of the device, and are less sharp than ordinary cutlery;

4) Dishwasher safe—the device is easy to clean, either by hand or in a dishwasher;
5) Low cost—it can be produced using plastic materials and inexpensive molding processes;
6) Minimal moving parts; Minimal food waste—no excess or waste cuts are produced; and
7) Variable size—it can be scaled to handle various lengths and diameter food products.

The wheeled embodiment is intended for mass production of the cut food product in a commercial factory environment. In this manner, cut hot dogs or other products can be manufactured on a high volume scale prior to packaging and shipping to the consumer for cooking. For this reason, the unit is designed to operate continuously as a spinning wheel that can be adapted to the speed and number of production lines, as well as the diameter and length of the food product. To accommodate large volumes, a set of the conveyor racks can be placed on a rotating conveyor system, allowing continuous operation of the device. The device is designed so that it can be placed "in-line" with an existing production facility. It assumes that some type of rotary shaft power is available to drive the wheel or the conveyor rack. Such a device can be added to an existing production line with minimal effort.

DESCRIPTION OF THE DRAWINGS

The following description of the preferred embodiments may be understood better if reference is made to the appended drawing, in which.

DETAILED DESCRIPTION OF THE PREFERRED EMBODIMENT

Figure 1:
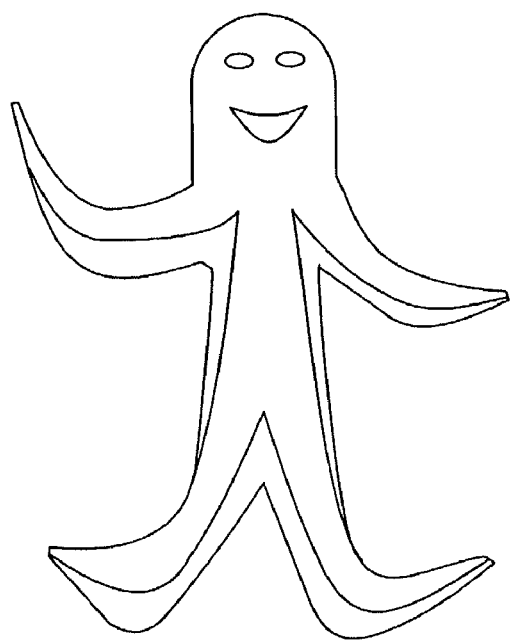
FIG. 1 is a front view of the hot dog shown in FIG. 2 after the hot dog has been cooked.

While preferred embodiments of the present invention have been illustrated and described herein, it is to be understood that various changes may be made therein without departing from the spirit of the invention, as defined by the scope of the appended claims.

FIGS. 3 through 6 show a hinged cutting device 10 that is provided by the present invention. Device 10 makes a pattern of incisions in a food product that produces a character with arms, legs and a facial expression after the food product is cooked by, for example, boiling, frying, microwaving, roasting or barbecuing. The degree of extension of the arms and legs outward from the body of the character, and the opening of the figure's eyes and mouth, will vary depending on the method and duration of cooking, and the properties of the food product's skin relative to its interior.

Device 10 is particularly adapted to make a pattern of incisions in such elongated food products as hot dogs and sausages, although it may be used to make incisions in other food products. Device 10 includes a housing 12, which includes an upper housing unit 14, and a lower housing unit 16. Upper surface 18 of upper housing unit 14 is curved for both aesthetic and ergonomic reasons. The corners of units 14 and 16 are also rounded to provide an appealing and easy to handle shape. Units 14 and 16 are connected to each other with a hinge 20. Thus, units 14 and 16 can be pivoted around hinge 20 to open cutter 10 (see FIGS. 3 and 4) and to close cutter 10 (see FIGS. 5 and 6). Housing 12 of device 10 is shaped to resemble a hot dog bun in its outer appearance.

Blades 26, 28 and 30 are formed in or mounted to the bottom of upper housing unit 12, and make the incisions in the food product 11 (see FIGS. 5 and 6A) that form the arms and legs of the figure. They also act to help stabilize the food product 11 in lower housing 16 after they enter the food product 11. Specifically, blades 26 and 28 form the incisions for the arms, and blade 30 forms the incision for the legs. Puncture blades 54, 56 and 58 are formed in or mounted to the bottom of upper housing unit 14, and make the punctures in the food product 11 that forms the facial expression for the figure. Blades 54 and 56 form the punctures for the eyes, and blade 58 forms the puncture for the mouth.

Lower housing unit 16 includes a food product holder 40, which defines a product receptacle 38 in which an elongated food product 11 can be placed for cutting by device 10. Holder 40 and receptacle 38 help to stabilize the position of an elongated food product 11 during the cutting process. Holder 38 defines a pair of blade receptors 42 and 44 that receive blades 26 and 28, respectively, when housing 12 is closed. Lower housing unit 16 also defines indented side panels 52 that facilitate the user's gripping of the device 10.

A cutting shield or retainer 22 is secured to end 23 and is shaped to conform to the upper half of a hot dog or sausage that is placed into lower housing unit 16. The cutting shield is attached to end 23 with a hinge 24. A raised area 25 is formed in shield 22 to allow shield 22 to cradle an elongated food product 11 that is held by receptacle 38 when device 10 is closed. Slots 32, 34 and 36 are formed in cutting shield 22, and allow blades 26, 28 and 30, respectively, to pass through shield 22 and contact a hot dog resting in receptacle 38 when housing 12 is closed. An opening 41 is formed in shield 22 to allow puncture blades 54, 56 and 58 to pass through shield 22 and into the food product 11 during the cutting process. A raised boss 46 is formed on or mounted to each of the inside surfaces 48 and 50 of upper housing unit 14, and hold cutting shield 22 securely in place over the food product 11 as the device 10 is closed and the cutting process is commenced.

To operate device 10, device 10 must be placed in the open position by lifting both the hinged upper housing unit 14 and cutting shield 22, and then swinging them away from the lower housing unit 16. With device 10 in the open position, a hot dog 11 or sausage, or other elongated food product, may be inserted into the receptacle 38 of holder 41. Once the food product 11 is resting in the receptacle 38, the cutting shield 22 is closed, thus covering the food product 11. Finally, the upper housing unit 14 is closed. As the device 10 is moved to the closed position, the raised bosses 46 inside the cover contact the cutting shield 22 and hold it firmly in place over the food item. The cutting blades 26, 28, 30, then pass through the shield, into and through the food product 11, and blades 26 and 28 rest in slotted receptors 42, 44 formed by receptacle 38 at the final closing point of the device 10. The receptors 42, 44 in receptacle 38 extend outward, beyond the exterior of the outer surface of the elongated food product 11, which allows the blades 26 and 28 to contact the outer skin of the food product 11 in a slight shearing motion that facilitates a clean incision. Also, upper closing device 10, puncture blades 54, 56 and 58 puncture the outer surface of the food product 11 to form the facial expression of the figure.

To remove the sculpted food product 11, housing 12 of device 10 must first be opened. As the housing 12 opens, the blades 26, 28, 30, 54, 56 and 58 are retracted from the food item, while the cutting shield 22 remains in place, temporarily secured by the raised bosses 46, to hold the food product 11 in place and oppose the upward motion of the blades. Once the housing 12 is fully opened, the cutting shield 22 may be lifted past the bosses 46, and the sculpted food product 11 can be removed for cooking.

Figure 2:
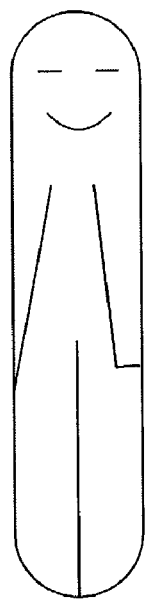
FIG. 2 is a front view of a hot dog that has been cut to form a figure with arms, legs and a "facial expression" after cooking.
Figure 3:
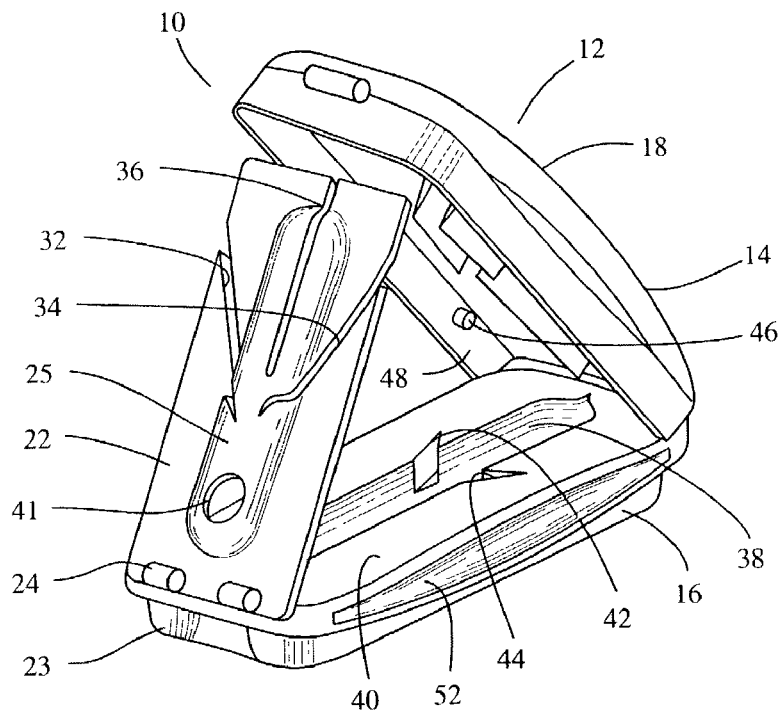
FIG. 3 is a top perspective view of a hinged elongated food product cutter constructed according to the provisions of the present invention, in a load position.
Figure 4:
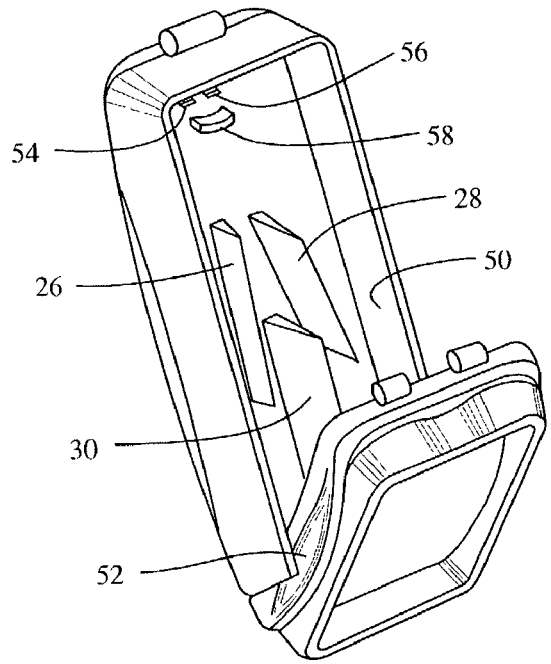
FIG. 4 is a bottom perspective view of the cutter shown in FIG. 3, in a load position.
Figure 5:
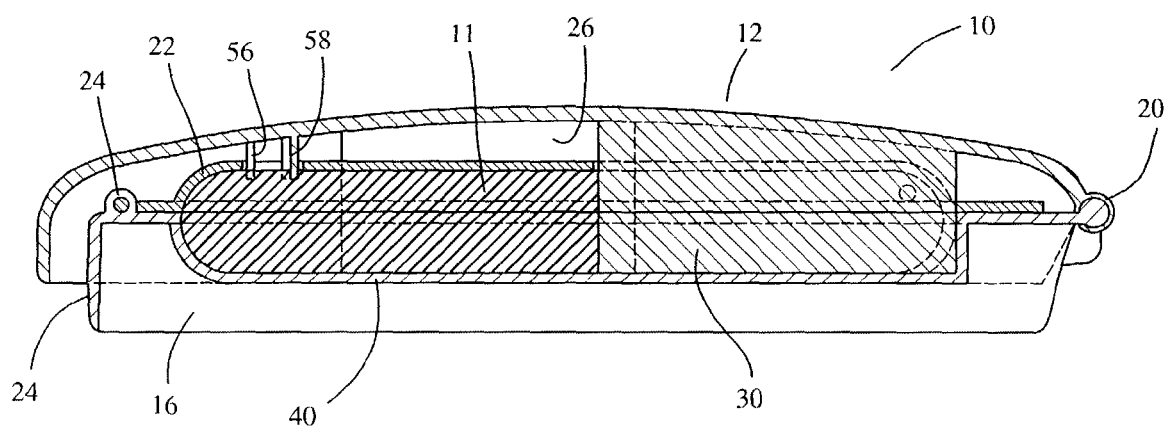
FIG. 5 is a side view of the cutter shown in FIG. 3, in the cut position, with a hot dog disposed in the cutter.
Figure 6A:
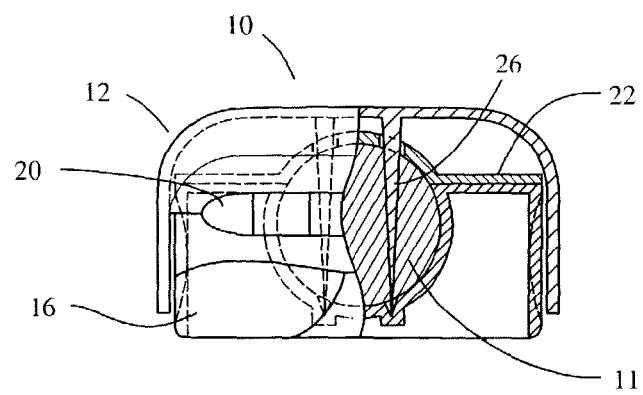
FIG. 6A is an end view of the cutter shown in FIG. 5, partially in section.
Figure 6B:
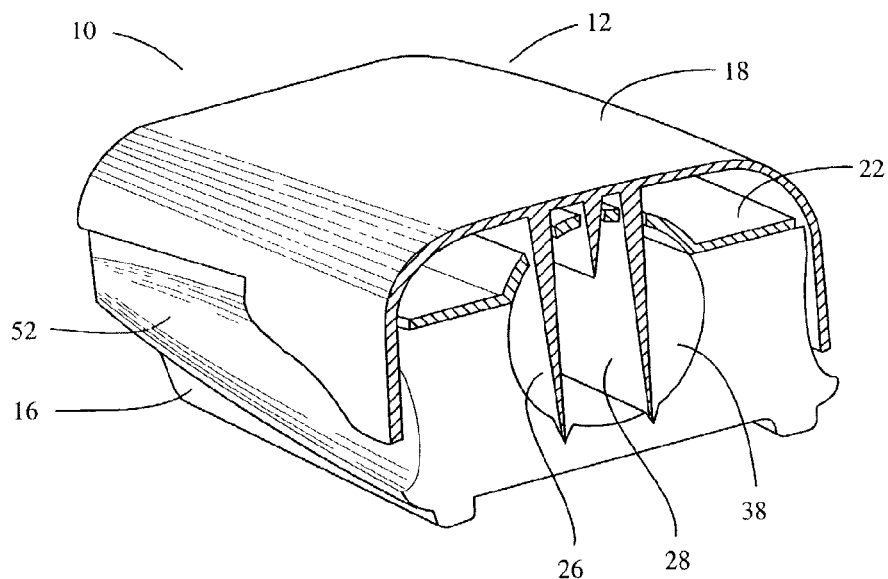
FIG. 6B is a section view of the cutter shown in FIG. 5.

The puncture blades 54, 56 and 58 that sculpt the facial expression on the food product 11 penetrate the skin of the food product 11 and extend only a small distance (approximately ⅛ inch) into the interior of the food item. This penetration is sufficient to produce a recognizable facial expression when the food product 111 is cooked. Punctures deeper than ⅛ inch have a higher tendency to develop tears in a meat product during cooking. FIG. 2 shows the sculpted cuts in the uncooked food product 11 after removal from the cutting device 10. Cuts for the arms, legs, and facial expression can be seen in this view. The final shape achieved after cooking is shown in FIG. 1. In this view, the human figure is apparent. While the device 10 is designed to make consistent sculpted cuts, the resulting shape will vary depending on the length and method of cooking, as well as the unique properties of the food product 11.

The cutting blades of device 10 may be arranged into other configurations (with a corresponding cuffing shield) to provide other characters or designs. Preferably, the blade width varies from ⅟32 to ⅛ inches, and is at a depth of at least 1" so that the blades are sufficient to cut through a normal sized hot dog of ⅟16 inch diameter. The blades should have a cutting edge sufficiently sharp to pierce the skin of a hot dog at the first point of contact.

The device can be manufactured out of several different materials. In experiments, it was found that acrylic plastics were sufficiently strong to create blades for effective sculpting. Therefore, it is possible that the device can be made using low cost methods such as injection molding. Plastic also offers the advantage that it can be easily cleaned, is relatively safe to use, and the device can be made in numerous bright colors, which may be appealing to children. As an alternative, the cutting blades may be made of stainless steel, and be attached into the lid in a removable plate such that numerous sculpting shapes could be accommodated.

Figure 7:
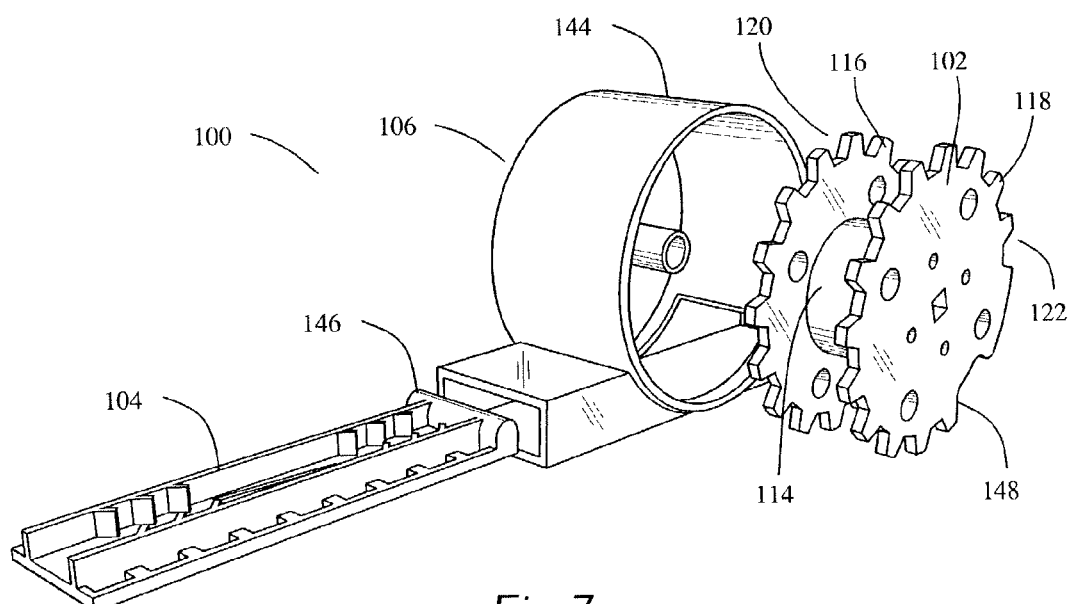
FIG. 7 is an exploded view of a wheeled elongated food product cutter constructed according to the teachings of the present invention.
Figure 8:
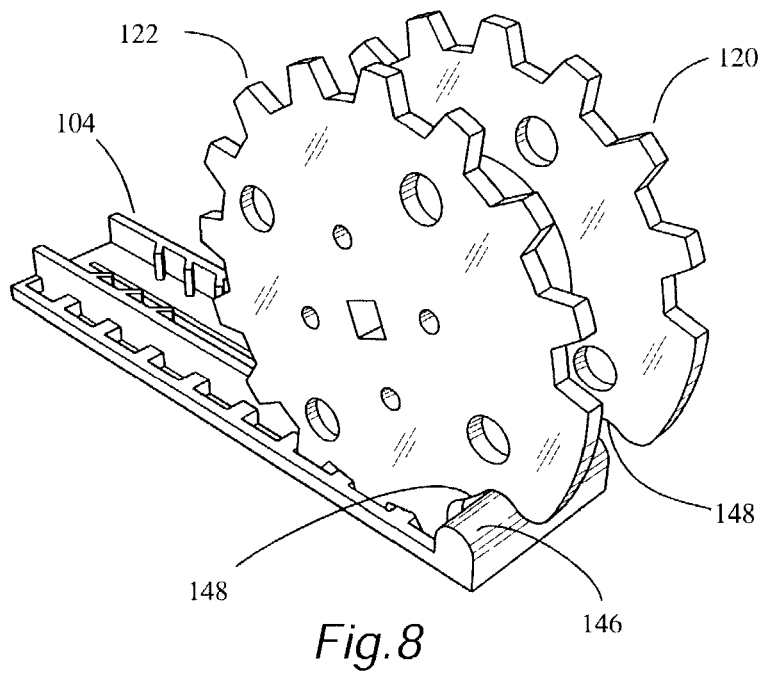
FIG. 8 is a perspective view of the wheel and rack of the cutter shown in FIG. 7.

FIG. 7 is an exploded view of a wheeled elongated food product cutter 100 that can be constructed according to the teachings of the present invention. Wheeled cutter 100 includes a cutting wheel 102, a conveyor rack 104, and housing assembly 106. Cutting wheel 102 connects to and drives rack 104. The axis of cutting wheel 102 is aligned directly above rack 104 and drives the linear motion of rack 104 using gear teeth 116 and 118.

Rack 104 holds an elongated food product that is cut as cutting wheel 102 drives rack 104 under wheel 102 and through housing 106. During production, as the food product moves along a conveyor (not shown) carrying the rack 104 that bears the food product, it can be oriented such that the forward motion of the food product is parallel to the major (longest) axis of the food product. Thus, the food product is oriented properly for cutting as the rack 104 bearing the food product enters housing 106.

Cutting wheel 102 includes a pair of gear members 120 and 122, and a hub 114. Generally, wheel 102 is driven by a rotating shaft or axle, which is driven in any known, desired fashion (not shown), and drives the food product bearing rack 104 through housing 106, making the desired incisions in the food product in the process. The housing 106 acts as a support for the shaft or axle that is used to drive the cutting wheel 102 at a desired speed.

Figure 9:
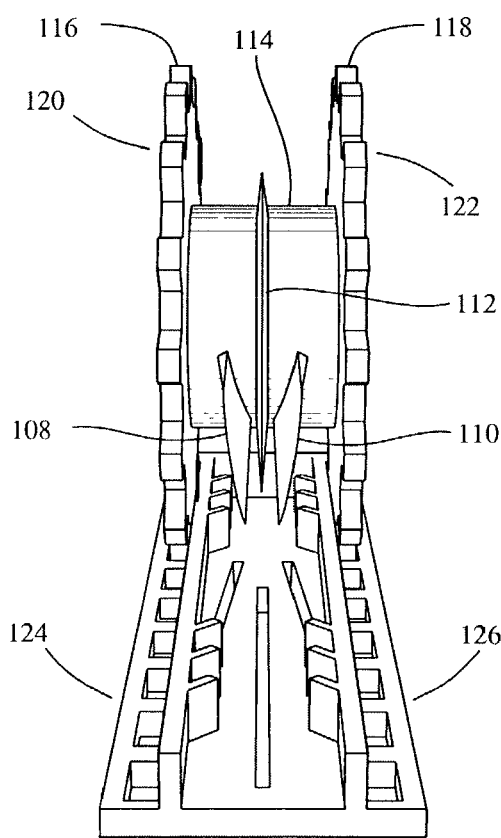
FIG. 9 is a front view of the wheel and rack shown in FIG. 8.
Figure 10:
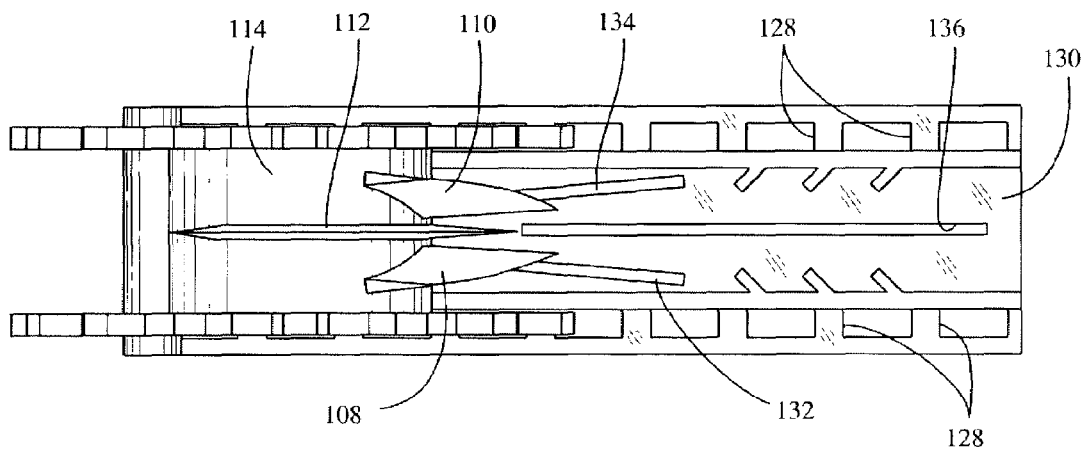
FIG. 10 is a top view of the wheel and rack shown in FIG. 8.
Figure 12:
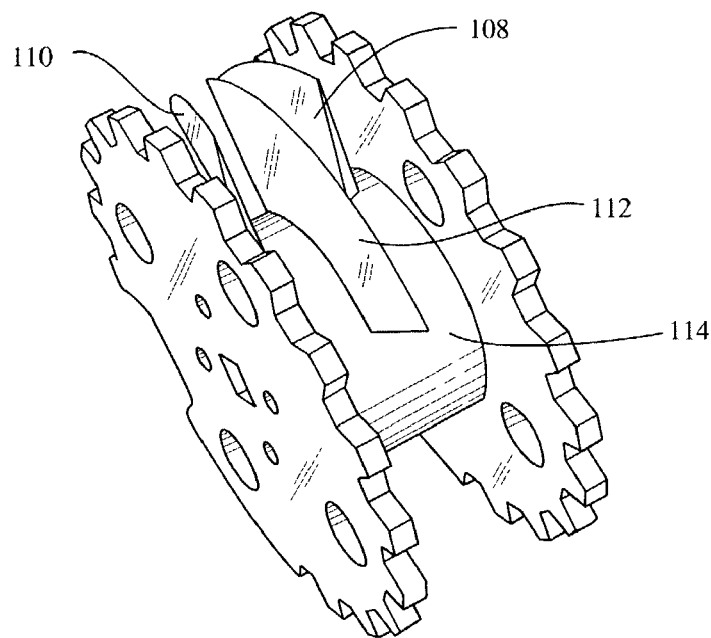
FIG. 12 is a perspective view of the cutting wheel shown in FIG. 7.

Referring particularly to FIGS. 9, 10 and 12, three cutting blades 108, 110 and 112 are formed on or mounted to hub 114 of cutting wheel 102, which are used to create the arms and legs of the figure. Cutting wheel 102 defines two sets of gear teeth 116 and 118 that are formed on gear members 120 and 122, respectively.

Rack 104 includes a bed 130 that is adapted to hold the elongated food product on rack 104 as it is being cut. Bed 130 defines three blade slots 132, 134 and 136 that are positioned to receive blades 108, 110 and 112, respectively, as wheeled cutter 102 rolls along rack 104. Rack 104 defines a pair of gear tracks 124 and 126, each of which includes a series of rectangular openings 128 that are designed to receive gear teeth 116 and 118. Cutting wheel 102 is positioned on rack 104 to allow gear teeth 116 and 118 to engage openings 128 of gear tracks 124 and 126 as wheel 102 rolls along track 104. The linear motion (ft/sec) of the rack is equal to the rotary speed (radians/sec) of the wheel.

Housing 106 defines a cutting chamber 142 having an entry port 138 and an exit port 140 and a cutting wheel chamber 144. During operation of cutting device 100, an elongated food product is placed on bed 130 of rack 104, rack 104 is inserted into cutting chamber 142 through entry port 138 until it engages cutting wheel 102, and cutting wheel 102 drives rack 104 through cutting chamber 142 until it exits cutting chamber 142 through exit port 140, at which point rack 104 is removed from cutting chamber 142.

Figure 11:
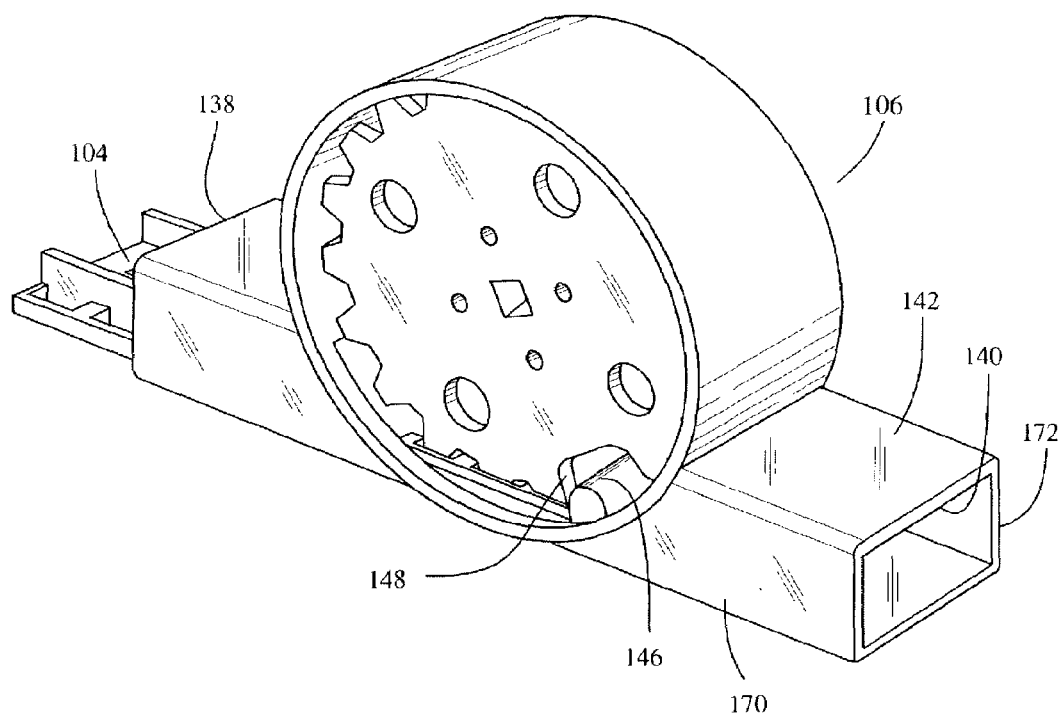
FIG. 11 is a side view of the cutter shown in FIG. 7, shown in partial cutaway, with the cutting wheel engaging the conveyor rack.

Rack 104 defines a raised leading edge 146 and gear members 120 and 122 define timing slots 148 that are used to ensure that the blades 108, 110 and 112 are positioned properly with respect to the position of the elongated food product on bed 130 of rack 104. Referring to FIG. 11, the conveyor rack 104 is shown after leading edge 146 has passed through the entry port 138 to the housing and become engaged with timing slots 148. Raised edge 146 leads the rack 104 into the cutting chamber 142, and engages the cutting wheel 102 at the timing slots 148. Slots 148 and edge 146 ensure that the rotation of the cutting wheel 102 and engagement position of the blades 108, 110 and 112 correspond to the correct location of the elongated food product as it rests on the bed 130 of conveyor rack 104.

Figure 13:
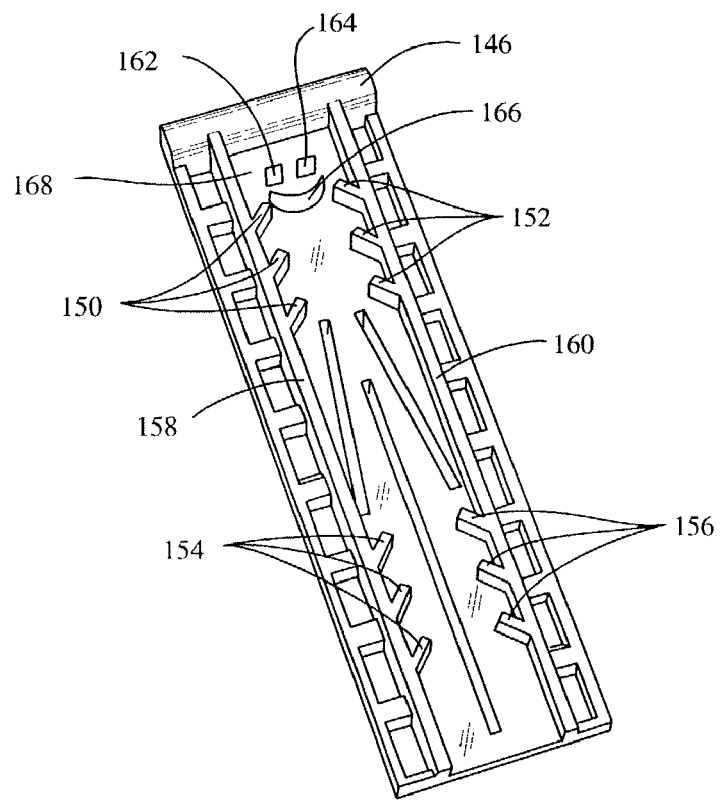
FIG. 13 is a top plan view of the conveyor rack shown in FIG. 7.

Referring to FIG. 13, rack 104 defines gripping ribs 150, 152, 154 and 156 on bed 130 of rack 104. Rack 104 also defines a pair of rails 158 and 160. Ribs 150 and 154 extend at an angle from rail 158, and ribs 152 and 156 extend at an angle from rail 160. Ribs 150, 152, 154 and 156 help grip the elongated food product as it rests on bed 130 of rack 104, and prevent the elongated food product from slipping as it rolls under the cutting wheel 102. Recessed blade slots 132, 134 and 136 formed in bed 130 permit the blades 108, 110 and 112 to pass completely through the food product and extend just below bed 130 of rack 104. Three puncture blades 162, 164 and 166 are formed on or mounted to end 168 of bed 130 near raised edge 146. Blades 162, 164 and 166 make the partial cuts in the food product as the food product passes beneath cutting wheel 102 to create a facial expression for the figure formed by the food product. Blades 162 and 164 are used to create the punctures that form the eyes for the figure, and blade 166 is used to create the puncture that forms the mouth of the figure.

Device 100, as shown in the drawings, is used for a single pass operation. That is, one elongated food product is cut at a time. However, for multiple or continuous operation, the length of the conveyor rack can be adjusted so that each pass of s single rack rotates the cutting wheel and timing slots into position to accept the next hot dog.

In a production facility, many conveyor racks 104 can be linked together as a rotating belt. The food product can then travel along the conveyor rack 104 and be pulled into the cutting wheel 102. As the wheel 102 continues to rotate, the small facial blades 162, 164 and 166 create a partial cut in the food product. The larger cutting blades 108, 110 and 112 then shear through the food product and pass into the recessed slots 132, 134 and 136 in the conveyor rack 104. After cutting the food product, the wheel 102 rotates through one complete revolution, and is then ready to engage the next food product in the production line.

As the food product passes under the wheel 102, it exits along with the conveyor rack through the exit port 140 of cutting chamber 142 of housing 106. The housing also acts to guide the food product away from the inner surface of the wheel 102, after the cutting is complete. It is desirable that at least one side panel 170 or 172 of the cutting chamber 142 be removable to allow for easy access to clean and service the device 100.

Device 100 can be manufactured from a variety of materials, however, the cutting wheel 102 is probably best suited for metal fabrication as this material has sufficient strength and durability to be used in a continuous production process. The design of the wheel 102 and conveyor rack 104 can be scaled to accommodate various diameters and lengths of food products. In addition, a series of cutting wheels 102 may be placed in parallel to increase the production output.

Additional changes may be made to the design of the invention—including; but not limited to the creation of sports team figures, male and female figures, varying facial expressions, and children. These variations should not be considered as a departure from the subject invention.

What is claimed is:

1. A device for shaping a food product, comprising:
    a cutter having a first side, a second side, a first end, a second end and a longitudinal axis extending through the first and second ends, the cutter including a plurality of blades for cutting completely through a thickness of the food product, the plurality of blades including a first blade, a second blade, and a third blade adapted to make a plurality of incisions through the food product, each of the first, second and third blades having a first end and a second end;
    the first blade defining a first blade axis, the first blade extending along the longitudinal axis of the cutter and extending from substantially the first end of the cutter toward the opposite second end of the cutter for effecting a first cut in the food product simulating leg portions of a figure, the first end of the first blade positioned at substantially the first end of the cutter;
    the second blade positioned angularly with respect to the longitudinal axis of the cutter and at an angle with respect to the first blade axis, the second blade disposed on one side of the first blade axis and extending from the first end of the second blade in a direction toward the second end of the cutter and toward the first blade axis for effecting a second cut in the food product simulating a first arm portion of the figure, the first end of the second blade being disposed proximate the second end of the first blade;
    the third blade positioned angularly with respect to the longitudinal axis of the cutter and at an angle with respect to the first blade axis, the third blade disposed on the other side of the first blade axis and extending from the first end of the third blade in a direction toward the second end of the cutter and toward the first blade axis for effecting a third cut in the food product simulating a second arm portion of the figure, the first end of the third blade being disposed proximate the second end of the first blade;
    wherein each of the first, second and third blades are separated from the other blades by a gap such that the food product remains as a single piece after cutting through the food product, whereby the blades are configured for forming the food product into a figure with arms and legs; and
    a holder for holding the food product as said cutter makes the plurality of incisions in the food product.

2. The device recited by claim 1 wherein said cutter and said holder are engaged with each other as the food product is cut by said device.

3. The device recited by claim 2, wherein said cutter and said holder are hingedly connected to each other to form a housing that can be closed to cut the food product.

4. The device recited by claim 3 wherein said first, second and third blades are located on the interior of said housing.

5. The device recited by claim 1, further comprising a retainer that holds the food product in place as said first, second and third blades are making the incisions in the food product and that holds the food product in place as said first, second and third blades are being withdrawn from the food product.

6. The device recited by claim 1, wherein the second and third blades are disposed in spaced apart relationship to the first blade, the first, second and third cuts of the first, second and third blades enable the food product to remain as a single unit, while allowing separation of at least one portion of the food product from an adjacent portion of the food product for forming the figure with arms and legs.

7. A device for shaping a food product comprising:
    a cutter having a first end and a second end and including a first blade, a second blade, and a third blade, each of the blades having a first end and a second end;
    the first blade defining a first blade axis, the first blade extending longitudinally from substantially the first end of the cutter in a direction toward the second end of the cutter;

a second blade disposed on one side of the first blade axis and extending from the first end of the second blade in a direction toward the second end of the cutter and toward the first blade axis, the first end of the second blade being disposed proximate the second end of the first blade;

a third blade disposed on the other side of the first blade axis and extending from the first end of the third blade in a direction toward the second end of the cutter and toward the first blade axis, the first end of the third blade being disposed proximate the second end of the first blade;

wherein each of the first, second and third blades are separated from the other blades by a gap such that the food product remains as a single piece after cutting through the food product, whereby the blades are for making a plurality of incisions in the food product; and a holder for holding the food product as said cutter makes the plurality of incisions in the food product, wherein said first, second and third blades cut completely through the food product to provide a figure with arms and legs.

8. The device recited by claim 7 wherein said cutter includes fourth, fifth and sixth blades disposed at the second end of the cutter for puncturing the food product to provide a figure with a facial expression.

9. A device for cutting an elongated food product comprising a hinged housing having a longitudinal axis extending through first and second ends of the housing, the hinged housing capable of assuming a load position, in which the food product may be positioned within said housing for cutting and a cut position, in which a food product positioned within said housing has been cut by the action of moving said housing to the said cut position and a first blade, a second blade, and a third blade disposed in said housing for cutting the food product when the food product is positioned within said housing and said housing is moved to the cut position, and a retainer for holding the elongated food product in place as said housing is moved from the cut position to a load position to facilitate withdrawal of said first, second and third blades from the food product, each of the first, second and third blades having a first end and a second end, the first blade defining a first blade axis disposed along the longitudinal axis of the housing and extending from substantially the first end of the housing toward the opposite second end of the housing, the first end of the first blade positioned at substantially the first end of the housing, the second and third blades disposed angularly with respect to the longitudinal axis and angularly with respect to the first blade, the second and third blades disposed on opposite sides of the first blade axis and extending from the first end of the second and third blades in a direction toward the second end of the housing and toward the first blade axis, the first ends of the second and third blades being disposed proximate the second end of the first blade, wherein each of the first, second and third blades are separated from the other blades by a gap such that the food product remains as a single piece after cutting through the food product, whereby the blades are configured for forming the food product into a figure with arms and legs.

* * * * *